March 13, 1945.  A. E. GLANCY  2,371,165
WIDE APERTURE OBJECTIVE
Filed Oct. 10, 1941  4 Sheets-Sheet 1

COLOR (F-C) UNDERCORRECTED 0.14 M/M

| LENS | GLASS | RADII | THICKNESS | SPACING |
|---|---|---|---|---|
| I | CROWN 1.5232  V = 58.6 | $R_1 = 27.649$ M/M  $R_2 = 26.667$ M/M | 2.86 M/M | |
| | | | | AIR SPACE  7.82 |
| II | (JENA) BAK-2  1.5400  V = 59.6 | $R_3 = 52.839$  $R_4 = 39.805$ | 12.87 | |
| | | | | CEMENTED |
| III | (JENA) S.F. 5  1.6727  V = 32.2 | $R_5 = 39.805$  $R_6 = 190.68$ | 1.91 | |

A WIDE APERTURE TELESCOPE OBJECTIVE

INVENTOR.
ANNA ESTELLE GLANCY
BY Louis L. Vaynor
ATTORNEY.

March 13, 1945.  A. E. GLANCY  2,371,165
WIDE APERTURE OBJECTIVE
Filed Oct. 10, 1941   4 Sheets-Sheet 2

CHART M

| 1 | 2 | 3 | 4 | 5 |
|---|---|---|---|---|
| K | B.F. |  | E.F.L. |  |
| 0 | 87.42 M/M |  | 100.00 M/M |  |
| 10.66 M/M | 87.33 " | -0.09 | 99.88 " | -0.12 |
| 15.07 " | 87.38 " | -0.04 | 99.86 " | -0.14 |
| 18.46 " | 87.51 " | -0.09 | 99.85 " | -0.15 |
| 21.32 " | 87.63 " | +0.21 | 99.72 " | -0.28 |
| 23.84 " | 87.13 " | -0.29 | 98.73 " | -1.27 |

CHROMATIC VARIATION OF SPHERICAL ABERRATION
IN THE SYSTEM ILLUSTRATED IN FIG. I

INVENTOR
ANNA ESTELLE GLANCY
BY
ATTORNEY

March 13, 1945.　　　A. E. GLANCY　　　2,371,165
WIDE APERTURE OBJECTIVE
Filed Oct. 10, 1941　　　4 Sheets-Sheet 3

E.F.L. = 96.45 M/M
B.F. = 87.42 M/M

A — BACK FOCUS
---- EQUIVALENT FOCAL LENGTH

COLOR EXACTLY CORRECTED.

| LENS | GLASS | RADII | THICKNESS | SPACING |
|---|---|---|---|---|
| II | BAK-2 | $R_1$ = 52.839 M/M | 12.87 M/M | |
| | 1.5400 | | | |
| | 59.6 | $R_2$ = 39.805 M/M | | |
| | | | | CEMENTED |
| III | SF5 | $R_3$ = 39.805 M/M | 1.91 M/M | |
| | 1.6727 | | | |
| | 32.2 | $R_4$ = 190.68 M/M | | |

THE OBJECTIVE ILLUSTRATED IN FIG.1 WITHOUT THE PLANO MENISCUS.

INVENTOR
ANNA ESTELLE GLANCY
BY
Louis A. Gagnon
ATTORNEY

March 13, 1945.  A. E. GLANCY  2,371,165
WIDE APERTURE OBJECTIVE
Filed Oct. 10, 1941  4 Sheets—Sheet 4

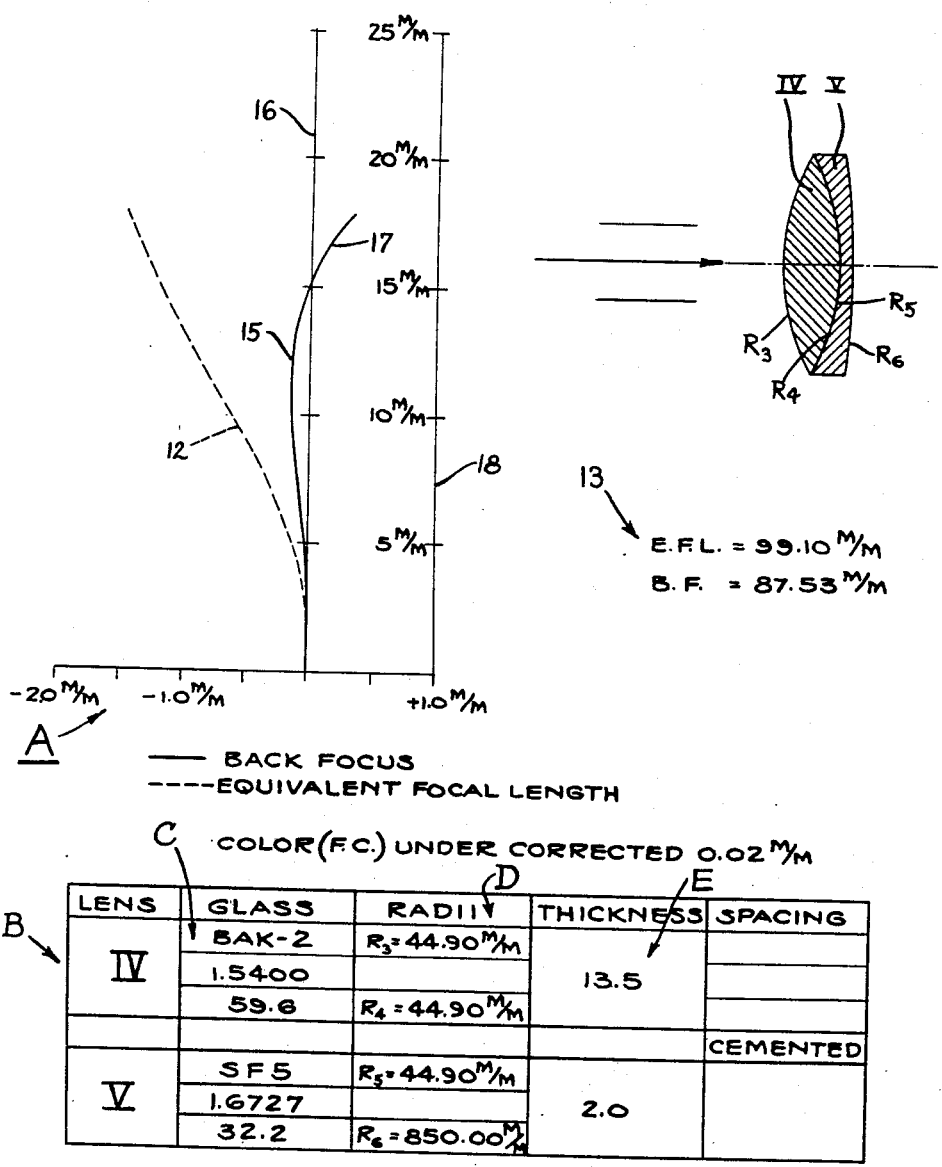

— BACK FOCUS
---- EQUIVALENT FOCAL LENGTH

COLOR (F.C.) UNDER CORRECTED 0.02 M/M

| LENS | GLASS | | RADII | THICKNESS | SPACING |
|---|---|---|---|---|---|
| IV | BAK-2 | | $R_3$ = 44.90 M/M | | |
| | 1.5400 | | | 13.5 | |
| | 59.6 | | $R_4$ = 44.90 M/M | | |
| | | | | | CEMENTED |
| V | SF5 | | $R_5$ = 44.90 M/M | | |
| | 1.6727 | | | 2.0 | |
| | 32.2 | | $R_6$ = 850.00 M/M | | |

OBJECTIVE WITHOUT PLANO MENISCUS RE-DESIGNED FOR REMOVAL OF SPHERICAL ABERRATION WITHOUT REGARD FOR COMA.

Fig. 4

INVENTOR
ANNA ESTELLE GLANCY
BY Louis L. Gagnon
ATTORNEY

Patented Mar. 13, 1945

2,371,165

UNITED STATES PATENT OFFICE 2,371,165

WIDE APERTURE OBJECTIVE

Anna Estelle Glancy, Sturbridge, Mass., assignor to American Optical Company, Southbridge, Mass., a voluntary association of Massachusetts Application October 10, 1941, Serial No. 414,495

2 Claims. (Cl. 88—57)

This invention relates to objectives and has particular reference to a novel objective of increased aperture ratio and method of making the same by reducing the higher order of spherical aberrations.

One of the principal objects of the invention is to produce a novel objective and method of making the same having a much wider aperture than has been possible to obtain in objectives of this nature in the past.

Another object is to provide a novel objective and method of making the same embodying a substantially zero or low power deeply curved meniscus element in combination with the main lens elements of the objective with said various elements having indices of refraction, surface curvatures and thickness of said elements so controlled that when combined with said miniscus element the said system will result in a wider or increased aperture with a decrease in spherical aberration.

Other objects and advantages of the invention will become apparent from the following description taken in connection with the accompanying drawings and it will be seen that many changes may be made in the details of construction, arrangement of parts and steps of the methods shown and described without departing from the spirit of the invention as expressed in the accompanying claims. I, therefore, do not wish to be limited to the exact details of construction, arrangement of parts and steps of the methods shown and described as the preferred forms only have been given by way of illustration.

Objectives are most commonly achromatic combinations of crown and flint glasses having the curvatures of the surfaces determined to give the system a definite focal length and at the same time reduce the spherical aberration and coma. Because of the limitation to glasses suitable with respect to indices of refraction and dispersive powers it rarely happens that such an objective is sufficiently free from spherical aberration of the higher orders to permit the diameter of the objective to be greater than ⅕ of the focal length.

With the present invention one is able to reduce the higher order of spherical aberration and coma to such an extent that the diameter of the objective may be 1/2.2 of the focal length in contrast to the usual limit of ⅕.

In the particular example shown in Fig. 1 of the drawings the system consists of a convexoconcave meniscus element I of relatively steep curvatures, moderate thickness and having relatively no focal power, followed by a typical crownflint cemented objective comprising elements II and III which the meniscus element contacts at the edge, leaving an air space at the center by reason of the greater curvature on the adjacent surface of the meniscus. This optical objective is achromatic, free from spherical aberration and coma and has an aperture ratio of approximately f/2.2. The residual spherical aberration within the usual tolerances is of the uncommon type, showing a reversal of the spherical aberration terms of higher order.

It has been found that the peculiar advantages of the invention are due to the related spherical aberration of the two surfaces of the meniscus element I and their consequent effects upon the spherical aberration of the succeeding surfaces of the elements II and III.

Due to the complexity of the higher orders of spherical aberration, the algebraic expressions are either entirely unknown or those that are known are too complex to be of service to the lens designer except to a very limited extent. Therefore, in endeavoring to obtain a reduction of the spherical aberrations of the higher orders recourse must be taken to rigorous trigonometric computation which, when systematically applied to a series of designs of lens systems, gave the very unusual results in that a nearly zero power meniscus lens of a suitable thickness and depth of curve added to a partially corrected objective of the usual type gave a great reduction and control of the higher order spherical aberrations. The particular example shown in Fig. 1 is one that completely reverses the type of spherical aberration given by the objective without the nearly zero power correcting lens, as illustrated in Fig. 3.

This same method may be applied to many objective systems by changing the depth of curvature, position of the compensating or meniscus lens and its thickness.

The lens shown and described is only by way of illustration. The compensating or meniscus lens shown is contacting adjacent the edge for convenience in manufacture but the elements may be spaced if desired.

Referring to the drawings:

Fig. 4 shows an objective redesigned for removal of spherical aberration and of the prior art type not embodying a substantially zero power meniscus element.

Figure 1:
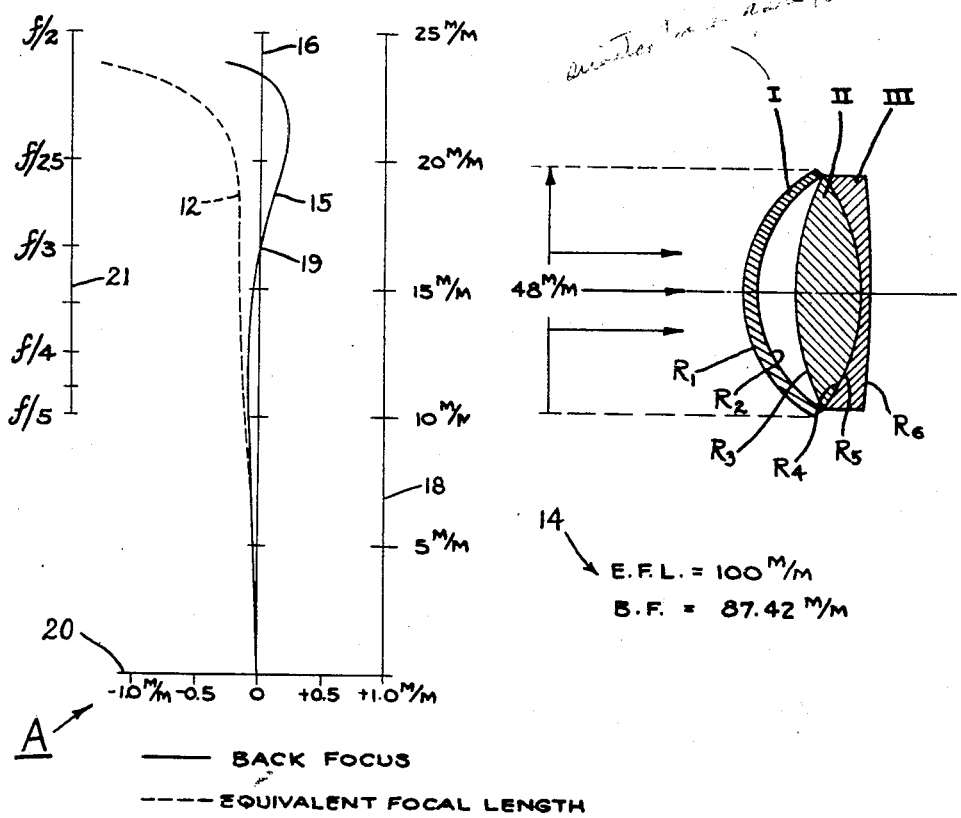
Fig. 1 shows the arrangement of lenses in the system with data for the construction of the particular wide aperture objective herein described.

In particular Fig. 1 shows the embodiment of the invention. The equivalent focal length of the system is approximately 100 mm. and the back focus is approximately 87.42 mm.

Figure 2:
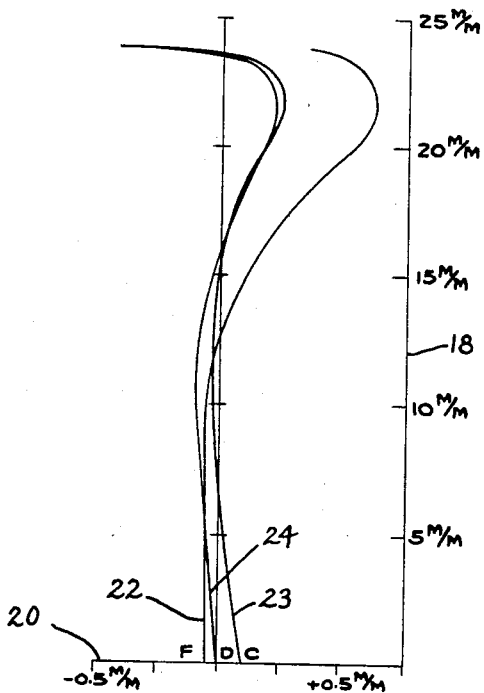
Fig. 2 shows curves for chromatic variation of the spherical aberration in the lens system illustrated in Fig. 1.

In Fig. 2 is shown the chromatic variation of the spherical aberration for the system in Fig. 1. This is about one half as large as usually expected.

Figure 3:
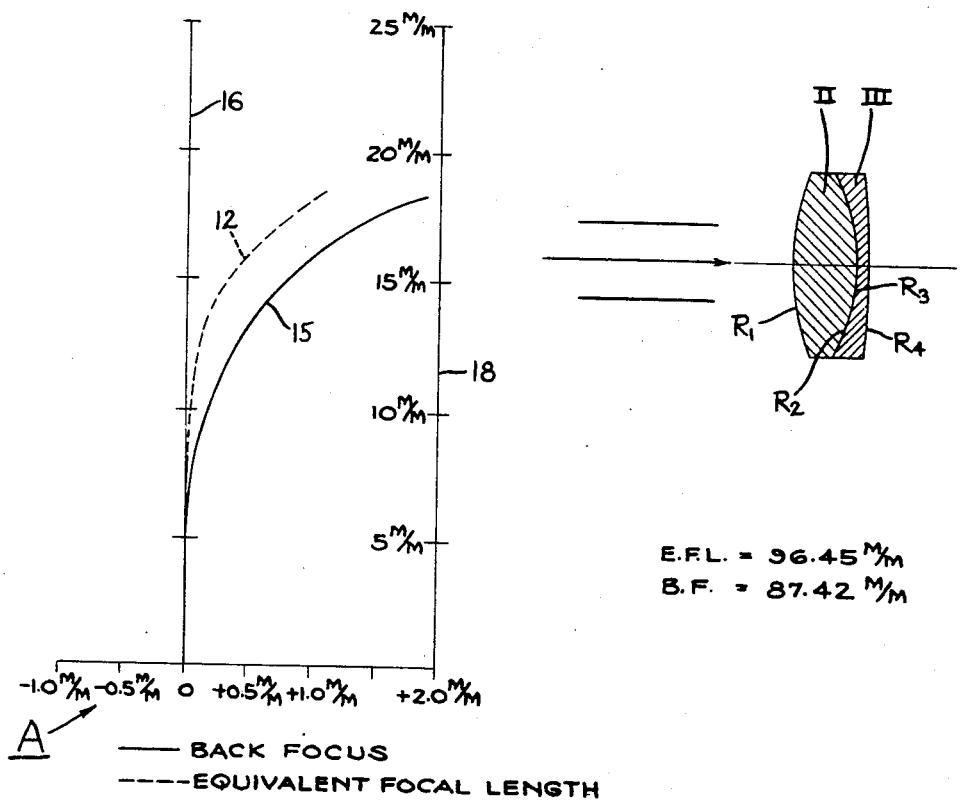
Fig. 3 shows objective, and other data for the objective illustrated in Fig. 1 without the planomeniscus lens.

Fig. 3 discloses the data with reference to lens II and III of Fig. 1 without the compensating meniscus element I of Fig. 1. The equivalent approximate focal length of this system is 96.45 mm. instead of the 100 mm. of Fig. 1 but the back focus of both are the same. The curvatures and thickness of Fig. 3 in the table B of said figure are the same as for lenses II and III of Fig. 1.

A comparison of the graphs for Fig. 1 and Fig. 3 shows that the meniscus element I, Fig. 1, moved both the zonal back focus and the zonal equivalent focal length to the left as shown in Chart A, Fig. 1. This greatly reduces both the higher order spherical aberration and coma. Chart B, Fig. 4, gives the optical data for the fabrication of the lens system shown in said Fig. 4 which is a system of ordinary design which utilizes the same glasses as the lens elements II and III of Figs. 1 and 3.

Fig. 4 shows an objective using the same glasses as in Fig. 3 with the spherical aberration reduced to a good form for this pair of glasses with an equivalent approximate focal length of 99 mm. and a back focus of approximately 88 mm. It will seem that the spherical aberration shown in Fig. 4, Chart A, becomes serious at a semi-aperture of just a little more than 15 mm. as indicated by the solid line 15 showing the back focus. The coma, as shown by the dash line 12 for equivalent focal length for different zones is not acceptable for an aperture greater than 20 mm.

Fig. 4 is given by way of illustration of how one of the past prior art types of lenses may be obtained for removal of spherical aberration. It will be noted that this lens comprises two elements IV and V. The element IV is formed of glass having, as shown in Chart B, column C, an index of refraction of 1.5400 and a reciprocal relative dispersion of 59.6 This element IV, as shown in column D, has a front surface curvature $R_1$ of a radius of approximately 44.90 mm. and a rear surface $R_2$ of a radius of approximately 44.90 mm. with a central thickness of approximately 13.5, as illustrated in column E of Chart B. The element V, as illustrated in column C is of an index of refraction of approximately 1.6727 and has an approximate reciprocal relative dispersion of 32.2. The surface $R_3$ has an approximate radius of 44.90 mm. and the surface $R_4$ is of a radius of approximately 850.00 mm., see column D of Chart D. The central thickness of said element V as illustrated in column E of Chart B is approximately 2.0. The particular indices of refraction of these two elements IV and V and radii of curvatures of the surfaces thereof are selected because of their effectiveness in reducing or removing spherical aberration in a lens system of this nature.

The glasses of the elements IV and V are the same glasses utilized for forming the lens system 2 and 3 of Fig. 1 and were selected for use in the example of the prior art lens illustrated in Fig. 4, in order to illustrate the best possible correction of spherical aberration which could be obtained with lens mediums of this nature without the use of a substantially zero power meniscus element such as illustrated in Fig. 1.

In order to reduce the spherical aberration the greatest possible amount, with glasses of this nature, care had to be exercised in computing the surface curvatures $R_1$—$R_4$ of said elements in order to give the best possible spherical aberration obtainable with such glasses.

It is to be noted that in Chart A, Fig. 4, the full line 15, which represents the back focus of the lens system, crosses the ordinate 16 at about the 15 mm. scale mark which thereby designates that the spherical aberration is corrected for an aperture slightly greater than 30 mm. It is to be noted that the solid line 15, from 0 to 15, remains very close to the ordinate 16 which is important in a lens system of this nature. It is to be noted that the line 15 above the 15 mm. scale mark, as illustrated at 17, has a sharp departure from the ordinate 16. The equivalent focal length of the lens system, as illustrated by the dash line, departs sharply from the solid line 15 indicating that the lens system does not embody a correction for coma. It is to be noted, as illustrated at 13, that the equivalent focal length of the lens system is approximately 99.10 mm. and that the back focus is approximately 87.53 mm.

The lens system described above gives the best possible correction for spherical aberration with the particular glasses employed. It is to be noted that in the lens system of Fig. 1, which embodies the substantially zero power meniscus element I, the elements II and III are of sensibly the same index of refraction as the elements IV and V as the lens system of Fig. 4. The surface curvatures $R_3$—$R_6$ of said elements II and III, however, in order to have the desired cooperative function with the substantially zero power meniscus element I, have been modified as illustrated in column D of Chart B, Fig. 1, so that the radius of curvature of the surface $R_3$ is approximately 52.839 instead of approximately 44.90 mm. as given in Fig. 4. The radius of curvature of the surface $R_4$ has been changed to approximately 39.805 mm. The surface $R_5$ to approximately 39.805 and the surface $R_6$ to approximately 190.68 mm. These surface curvatures have been modified so that when combined with the surface curvatures $R_1$ and $R_2$ of the substantially zero power meniscus elements they will reduce the error of spherical aberration and coma to a minimum and increase the aperture ratio a considerable amount over that obtainable with the lens system of Fig. 4. It is to be noted that the center thicknesses of said elements IV and V, as illustrated in column E, see Chart B, have been changed to the center thicknesses of the elements II and III of Fig. 1. This again is to produce the results desired.

With elements II and III formed of the particular indices of refraction set forth in column C of Chart B in Fig. 1 and with the particular radii of curvatures and thicknesses given for said elements in columns D and E of said chart, it is essential in order to obtain the results desired to utilize a substantially zero power meniscus element I formed of glass having an index of refraction of approximately 1.5232 and a reciprocal relative dispersion of approximately 58.6 as illustrated in column C in Chart B and having opposed surface curvatures $R_1$ and $R_2$ of approximately 27.649 mm. and 26.667 mm. respectively as illustrated in column D of said chart and a center thickness of approximately 2.86 mm. as illustrated in column E of said chart. As illustrated in column F of Chart B the element I has a central spacing from element II which results in an air space of approximately 7.82 mm. The resultant lens system of Fig. 1, as illustrated at 14 in Fig. 1, has an equivalent focal length of approximately 100 mm. and a back focus of approximately 87.42 mm.

In the well known manner of the art of lens design the back focus and the equivalent focal length are computed by rigorous trigonometric calculation for different zones of the lens. An example will make the graphs A of Figs. 1, 2, 3, and 4, clear. The figures under K in column 1 of Chart M give the various distances from the axis of the lens system at which rays were selected for computation. The figures under B. F. in column 2 of Chart M give the back focus for rays entering the lens system at the corresponding distances from the axis under K in column 1 of Chart M. The axial back focus was subtracted from each one of these zonal back foci. The difference with its proper algebraic sign was placed in column 3 of Chart M.

The equivalent focal length of each zone of the lens was computed and placed under E. F. L. in column 4 of Chart M. The axial equivalent focal length was subtracted from each zonal equivalent focal length. The difference for each zone was placed in its proper position with proper algebraic sign in column 5.

For example: Rays entering the lens infinitely near the axis have a back focus of 87.42 mm. and an equivalent focal length of 100.00 mm. Rays entering the lens in a zone at a distance of 10.66 mm. from the axis have a back focus of 87.33 mm. The difference between this zonal back focus and the axial back focus is −0.09 mm. These same rays, entering the system at a distance of 10.66 mm. from the axis have an equivalent focal length of 99.88 mm. The difference between this zonal equivalent focal length and the axial equivalent focal length is −0.12 mm.

The Charts A have a system of coordinates, lines 16 and 20. The origin of the system is the intersection of lines 16 and 20. The ordinates for both the solid line curve 15 and the dash line curve 12 are given in column 1 of Chart M. The corresponding abscissas of the solid line curve 15 are found in column 3 of Chart M. The abscissas for the dash line curve 12 are found in column 5 of Chart M.

The Chart M explains the construction of Chart A. All Charts A are constructed in the same manner.

In all the graphs A the horizontal spread between the solid line curve 15 and the vertical axis 16 is the spherical aberration. The horizontal spread between the dash line curve 12 and the solid line curve 15 is the coma.

Chart M

| 1 | 2 | 3 | 4 | 5 |
|---|---|---|---|---|
| K | B. F. | | E.F.L. | |
| Mm. | Mm. | Mm. | Mm. | Mm. |
| 0 | 87.42 | | 100.00 | |
| 10.66 | 87.33 | −0.09 | 99.88 | −0.12 |
| 15.07 | 87.38 | −0.04 | 99.86 | −0.14 |
| 18.46 | 87.51 | +0.09 | 99.85 | −0.15 |
| 21.32 | 87.63 | +0.21 | 99.72 | −0.28 |
| 23.84 | 87.13 | −0.29 | 98.73 | −1.27 |

At the left hand side of Chart A, Fig. 1, is a supplementary scale, line 21, which gives the aperture ratio for any corresponding semi-diameter of the lens on scale 18. This is readily seen from an example. Let the distance of a ray from the axis be 10 mm. on scale 18. Then a lens having the semi-diameter of 10 mm. includes all rays parallel to the axis and at a distance not greater than 10 mm. from the center of the lens.

The diameter is then 20 mm. and since the focal length (E. F. L.) is 100 mm. the aperture ratio is by definition 20/100 that is 1/5, i. e., the diameter of the lens is 1/5 the focal length. This is usually written f/5.

It is to be noted that at this above mentioned 10 mm. mark on scale 18 both the dash line curve and the solid line curve are very close to line 16, i. e., the lens system is very well corrected for both spherical aberration and coma for an aperture ratio f/5. Furthermore it is to be noted that the semi-diameter can be increased even to 23 mm. and the lens is still well corrected for spherical aberration and fairly well for coma. This indicates a useful aperture ratio of approximately f/2.2

The lens system of Fig. 1 embodying the elements I, II and III, as designated in Chart A, results in an aperture of approximately f/2.2. and is corrected not only for spherical aberration but also for coma as is readily determined by the equivalent focal length 12 and the solid line 15 and the proximity of both to the line 16.

Fig. 2 illustrates the chromatic variation of the spherical aberration. It is common practice to compute the spherical aberration for the C line of the spectrum (red), the D line (yellow), and the F line (blue). It is important in an optical system which receives ordinary light that the colors, red, yellow, blue shall come to the same focus as nearly as possible. In Fig. 2 the graph marked D is the same as the full line curve 15 in Chart A, Fig. 1. The ordinates and abscissas have the same meaning as in Fig. 1. The graph marked D in Fig. 2 is the spherical aberration of the lens of which the elements are given in Charts B, C, D, E, in Fig. 1. The calculations are made with glass indices of refraction for the D line of the spectrum as is usual in the art. The graph marked C gives the spherical aberration, calculated with glass indices of refraction for the C line of the spectrum; the graph marked F gives the spherical aberration calculated with the glass indices for the F line of the spectrum. The horizontal spread between the graphs show how nearly the red, yellow, blue colors come to the same focus. To those skilled in the art of lens design it will be apparent that the spread between the curves is approximately one half as great as is usual in this type of optical system, or, that the error commonly designated as the chromatic variation of the spherical aberration is about one half as great as is usual.

Fig. 3, as stated above, illustrates the elements II and III of the lens system of Fig. 1 taken alone or without the substantially zero power meniscus element I. As shown in Chart A of Fig. 3 the back focus, as designated by the full line 15, departs sharply from the ordinate 16 from adjacent the 10 mm. mark. The equivalent focal length, as illustrated by the dash line 12, departs from the back focus line 15 at approximately the same 10 mm. point so that the system could not be considered corrected for coma and spherical aberration beyond approximately 26 mm. aperture.

By again referring to Chart A of Fig. 1, when the substantially zero power meniscus element I is used in combination with the elements II and III, as illustrated in the lens system of Fig. 1, it will be noted that the back focus and equivalent focal length lines 15 and 12 respectively are brought closer together and caused to cling closely to the ordinate 16 throughout a greater effective aperture instead of a sharp departure from said ordinate line 16, as illustrated in Chart A of Fig. 3 as results from the lens elements II and III alone. The lens system of Fig. 3 is intentionally designed to yield a type of spherical aberration that can be corrected by the use of the substantially zero power meniscus element I. The extent of the spherical aberration and coma introduced by the combined lens elements II and III is controlled as to this portion of the lens system so that it is possible for said spherical aberration and coma to be corrected or altered by the substantially zero power meniscus element in an amount sufficient to cause said spherical aberration and coma to be reduced to a minimum throughout a relatively large aperture therein, that is, each of the components of the lens system is computed with the other component in mind so as to obtain the resultant minimum spherical aberration and coma.

The lens system of Fig. 1 is substantially an achromatic lens system having achromatic characteristics substantially throughout the area of the aperture of the system.

The chart in Fig. 2 illustrates that the color from the F line 22 to the C line 23 is undercorrected approximately 0.14 mm. along the axis of the lens system and remains substantially corrected throughout the aperture. The computations for the lens system of Fig. 1 are all based on the D line or sodium line of the spectrum as is common practice in the art, which D line is illustrated at 24 in Fig. 2. In forming the lens system suitable pieces of lens medium having the indices of refraction required are first selected. The various surface curvatures for said respective pieces of lens medium are ground and polished thereon by the usual prior art methods and the lens elements are properly aligned in proper position with each other and are, in some instances, secured in said relation through cement joinder of the parts. It is to be understood that if desired the various elements may be mechanically connected; the important factor is that the said elements be in proper optical relation with each other as defined by the Chart D in Fig. 1 for said system.

The zero power meniscus lens element I has but little altering effect as to axial chromatic aberration and thereby greatly simplifies the design of the lens system. It is to be be understood that although only certain glasses have been described other glasses may be used with the appropriate change in surface curvatures, thicknesses and separations. It is advisable in a system like that disclosed in Fig. 1 to use crown and flint glass which are separated by a large difference in the index of refraction as this assists in reducing the variation in spherical aberration with color.

The meniscus lens I which is used can be of most any type of glass but it may be chosen to change the higher aberration for different colors if desired depending upon the dispersion of the glasses used. The glass actually chosen for the lens element I of Fig. 1 was the ordinary ophthalmic crown in common use for forming ophthalmic lenses.

This has an added advantage in that it does not require a special lens medium. The other two elements II and III are of the light barium crown and dense flint respectively.

From the foregoing description it will be seen that simple, efficient and economical means and method have been provided for accomplishing all of the objects and advantages of the invention.

While the lens system has been set forth as being used with elements made of glass it is to be understood that the system may utilize members made of any other transparent substance such as plastic or other resinous material.

The particular system set forth employs an optical system of a particular type, namely, a telescope objective, but it is to be understood that a meniscus lens of substantially zero power may be utilized in other optical systems (for example, projection systems, camera lenses, microscopes), for the purpose of giving increased aperture ratio with correction for spherical aberration and coma and chromatic variation of spherical aberration.

Having described my invention, I claim:

1. An optical system comprising a plurality of optical elements combined to form an achromatic combination corrected as to spherical aberration and coma so as to have an aperture ratio greater than the usual limit of one-fifth of the focal length, said optical system comprising a principal unit embodying a plus and a minus lens element of lens mediums of given indices of refraction and having surface curvatures controlled according to said lens mediums to introduce the power desired of the optical system and simultaneously introduce a given spherical aberration and coma which may be compensated for by the introduction of an additional lens, said additional lens being a substantially zero power meniscal element positioned in alignment with the principal lens unit on the side thereof adjacent the plus lens element with the convex surface of said additional element exposed to incident light, the index of refraction of the material of said element, center thickness thereof, surface curvatures and axial distance of its inner surface from the spherical element being controlled so as to have substantially no altering effect as to the power of the principal unit but to introduce spherical aberration and coma of opposite sign to spherical aberration and coma of said principal unit of an amount sufficient to cause the resultant optical system to have an aperture ratio greater than one-fifth the focal length of the system with the spherical aberration, coma and achromatic variation of the spherical aberration reduced to a minimum throughout said aperture.

2. An optical system comprising a principal unit of positive power embodying a plus and a minus lens element of lens media of given indices of refraction and dispersion and having surface curvatures controlled according to the optical constants of said media to give the focal power desired of the optical system and to be approximately achromatic and simultaneously introduce a given spherical aberration and coma which is substantially compensated for by the introduction of an additional corrective lens, said additional lens being positioned in axial alignment with the principal unit with the concave side toward said principal unit and with the axial separation with respect to said principal unit being not more than fifteen per cent of the focal length of the system, said additional lens having a thickness less than five per cent of the focal length of the system and having a convex surface of a radius which is less than forty per cent and more than fifteen percent of said focal length combined with a concave surface of a radius which is such as to introduce approximately zero axial power, the index of refraction of said meniscal lens, center thickness thereof, surface curvatures and axial distance of its inner surface from the surface of the adjacent element of the principal unit being controlled so as to have substantially no altering effect as to the power of the principal unit but to introduce spherical aberration and coma of opposite sign to the spherical aberration and coma of said unit sufficient to cause the resultant optical system to have an aperture ratio greater than one-fifth of the focal length of the system, with the spherical aberration, coma and achromatic variation of the spherical aberration reduced to a minimum throughout said aperture.

ANNA ESTELLE GLANCY.